A. MELDRUM.
GAGE.
APPLICATION FILED JUNE 22, 1914.
1,192,089.
Patented July 25, 1916.
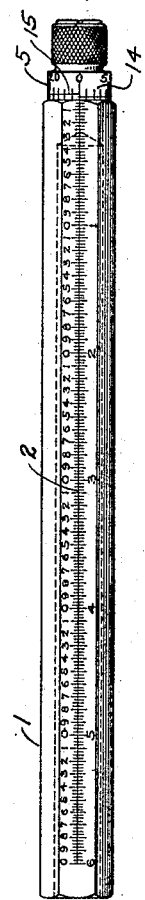
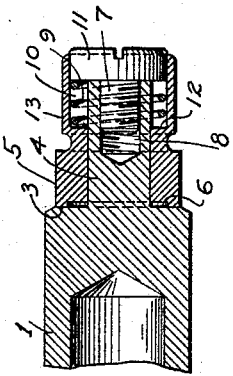
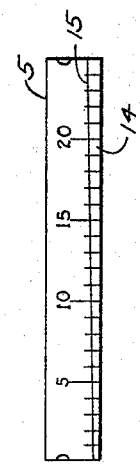
WITNESSES:
Paul F. Brown
Geo. B. Rawlings
INVENTOR:
ALEXANDER MELDRUM.
BY
ATTORNEY

UNITED STATES PATENT OFFICE.

ALEXANDER MELDRUM, OF SYRACUSE, NEW YORK, ASSIGNOR TO THE L. S. STARRETT COMPANY, OF ATHOL, MASSACHUSETTS, A CORPORATION OF MASSACHUSETTS.

GAGE.

1,192,089.     Specification of Letters Patent.     Patented July 25, 1916.

Application filed June 22, 1914. Serial No. 846,422.

*To all whom it may concern:*

Be it known that I, ALEXANDER MELDRUM, a citizen of the United States, residing at Syracuse, county of Onondaga, State of New York, have invented certain new and useful Improvements in Gages, of which the following is a specification.

This invention relates to instruments of precision and particularly to a gage for setting dividers. The need of an instrument which will permit the divider points to be set to very fine adjustments has been long felt. To comply with the essential requirements of extreme accuracy of measurement and nicety of adjustment such an instrument should be capable of giving practically a micrometer reading.

To the end therefore of providing such an instrument I have devised my present invention. In it, I use a gage comprising two relatively rotatable members having related graduations adapted to coact with each other and with a line inclined to the axis of rotation of the members on one of the members so as to give practically a micrometer reading in addition to the regular reading.

The construction and operation of my invention will be more fully disclosed in the specification which follows.

In the drawings I have shown as an illustrative embodiment a form of gage which has been found well adapted for the purposes intended and the requirements of manufacture.

Throughout specification and drawings like reference numerals are correspondingly applied, and in these drawings:

Figure 1 is an elevation of a gage constructed in accordance with my invention, Fig. 2 is a partial longitudinal section of the gage on an enlarged scale, and Fig. 3 is a development of the rotatable sleeve of the gage.

I have indicated at 1 a gage bar of any desired shape and length. As shown in Fig. 1 the bar is hexagonal in cross section and is hollow for substantially its entire length in order to reduce its weight. One of its faces is graduated in any desired scale 2. A convenient graduation is indicated in Fig. 1 wherein the bar is graduated in inches, the inches being divided into forty divisions with each tenth division numbered. The solid end of the bar is shouldered as indicated at 3 in Fig. 2 to provide an axial reduced stem 4 on which a graduated sleeve 5 is rotatably mounted. The sleeve 5 has an internal annular recess 6 about its inner end to reduce its bearing against the shoulder 3. The sleeve is seated against the shoulder 3 by a screw 7 threaded in the axial bore 8 of the stem 4. A coil spring 9 encircling the stem 4 assists with the screw 7 to seat the sleeve against the shoulder with a yielding bearing. The spring 9 is confined in a chamber 10 included between the head 11 of the screw 7 and the internal front wall 12 of a tubular extension 13 formed on the sleeve 5. The extension 13 is knurled externally to facilitate rotation of the sleeve. The sleeve 5 is graduated in any desired scale 14 having a definite relation to the graduations of the bar 1. A convenient graduation is seen in Fig. 3 wherein the sleeve is shown as divided circumferentially into twenty-five divisions with each fifth division numbered. Encircling the sleeve spirally is an indicated line 15 which coöperates with the graduations on the bar and sleeve to indicate the pitch. In this case, the line 15 indicates one-fortieth pitch to the inch.

In use, one point of the dividers is placed in any of the divisions of the graduated scale bar and the other point at the graduated crossing of the pitch line of the sleeve. With the conventional scale shown in the drawing, this gives any division in thousandths in addition to the regular graduations on the scale bar and amounts to practically a micrometer reading.

Various modifications in the form and construction of the gage, in the scale shown and the distance indicated may obviously be resorted to if within the limits of the appended claims.

What I therefore claim and desire to secure by Letters Patent is:

1. A gage for setting dividers comprising a longitudinally graduated gage bar and a graduated sleeve, said bar and sleeve being relatively rotatable and yieldably seated against each other and a spiral pitch indication continuously about one of said members in intersecting relation to the graduations thereof and coöperating with the graduations of the other member to set off distances.

2. A gage comprising a longitudinally graduated gage bar, hollow for substantially its entire length and closed at one end having a reduced extension providing a bearing, a graduated sleeve rotatably mounted on said extension and yieldably seated against said closed end of the bar, and a pitch indication continuously about one of said members and coöperating with the graduations of the other of said members to set off distances.

3. A gage comprising a longitudinally graduated hollow gage bar having a closed end terminating in a reduced extension providing a bearing, a graduated sleeve rotatably mounted on said extension and yieldably seated against said closed end of the bar and a pitch indication spirally about one of said members and coöperating with the graduations of the other of said members to set off distances.

4. A gage comprising a longitudinally graduated hollow gage bar having a closed end terminating in a reduced extension providing a bearing, a graduated sleeve rotatably mounted on said extension, said extension having a threaded bore, a screw set up in said bore for seating the sleeve against the closed end of the bar and a spring associated with said screw and effective therewith to yieldably seat said sleeve against the gage bar.

5. A gage comprising a longitudinally graduated hollow gage bar having a closed end terminating in a reduced extension providing a bearing, a graduated sleeve rotatably mounted on said extension, said extension having a threaded bore, a screw set up in said bore for seating the sleeve against the closed end of the bar, a spring associated with said screw and effective therewith to yieldably seat said sleeve against the gage bar and a pitch indication on one of said relatively rotatable members and coöperating with the graduations on the other of said members to set off distances.

6. A gage comprising a longitudinally graduated hollow gage bar having a closed end terminating in a reduced extension providing a bearing, a circumferentially graduated sleeve rotatably mounted on said extension and having a reduced bearing against said closed end of the bar said extension having a threaded bore, a screw set up in said bore, a spring associated with said screw and effective therewith to yieldably seat said sleeve against the closed sleeve and said sleeve having means coöperating with the graduations on said bar to set off distances.

7. A gage for setting dividers comprising a longitudinally graduated member and a circumferentially graduated member, said members relatively rotatable and yieldably seated against each other and the graduations of said members having relation to each other, and one of said members having means coöperating with the graduations of the other member to set off distances.

8. A gage for setting dividers and the like comprising a pair of members freely rotatable but not longitudinally movable one on the other and having related scales of graduations, the scale on one member being parallel to the axis of rotation and the scale on the other member being circumferential to said axis, one of said members having a line inclined to the plane of rotation and coöperating with the scale of the other member to indicate subdivisions of the spaces between the graduations of the scale parallel to the axis of rotation.

9. A gage comprising a longitudinally graduated member and a circumferentially graduated member, said members relatively rotatable, means for yieldably seating said members against each other, and one of said members having means coöperating with the graduations of the other member to set off distances.

10. A gage for setting dividers and the like comprising a pair of members freely rotatable but not longitudinally movable one on the other and having related scales of graduations, the scale on one member being parallel to the axis of rotation, and that on the other member being circumferential to such axis, the last named member having a continuous line inclined to the plane of rotation and disposed in intersecting relation to the graduations thereof and coöperating with the graduations of the other member to indicate subdivisions of the spaces between the graduations of the scale parallel to the axis of rotation.

11. A gage comprising a pair of members relatively rotatable but longitudinally immovable with relation to each other, said members having scales of related graduations, the scale on one member being parallel to the axis of rotation, and the scale on the other member being circumferential to such axis, one of said members having a line inclined to the plane of rotation and coöperating with the scale of the other member to indicate subdivisions of the spaces between the graduations of the scale on said other member.

In testimony whereof I affix my signature in presence of two witnesses.

ALEXANDER MELDRUM.

Witnesses:
S. DAVIS,
F. G. BODELL.